(12) United States Patent
Itoh et al.

(10) Patent No.: US 8,494,342 B2
(45) Date of Patent: Jul. 23, 2013

(54) RECORDING APPARATUS, REPRODUCING APPARATUS, RECORDING/REPRODUCING APPARATUS, RECORDING PROGRAM AND STORAGE MEDIUM THEREOF, AND REPRODUCTION PROGRAM AND STORAGE MEDIUM THEREOF

(75) Inventors: Norio Itoh, Chiba (JP); Masahiro Shioi, Tokyo (JP); Shinya Hasegawa, Chiba (JP); Akemi Oohara, Funabashi (JP); Satoru Inoue, Chiba (JP); Yoshiaki Ogisawa, Sakura (JP); Shuichi Watanabe, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1671 days.

(21) Appl. No.: 11/912,387

(22) PCT Filed: Apr. 19, 2006

(86) PCT No.: PCT/JP2006/308240
§ 371 (c)(1),
(2), (4) Date: Oct. 23, 2007

(87) PCT Pub. No.: WO2006/115151
PCT Pub. Date: Nov. 2, 2006

(65) Prior Publication Data
US 2009/0074382 A1 Mar. 19, 2009

(30) Foreign Application Priority Data
Apr. 25, 2005 (JP) ................. 2005-127133

(51) Int. Cl.
*H04N 9/80* (2006.01)
(52) U.S. Cl.
USPC ........................................... 386/239
(58) Field of Classification Search
None
See application file for complete search history.

(56) References Cited

U.S. PATENT DOCUMENTS
2005/0254798 A1* 11/2005 Kato ............................ 386/125

FOREIGN PATENT DOCUMENTS
| JP | 2000-341640 A | 12/2000 |
| JP | 2002-83486 A | 3/2002 |
| JP | 2004-206774 | 7/2004 |
| JP | 2004-259364 | 9/2004 |

OTHER PUBLICATIONS

"Advanced Systems Format (ASF) Specification Revision Jan. 20, 2003," Microsoft Corporation, Dec. 2004, pp. 3-6, <URL:http://www.microsoft.com/windows/windowsmedia/format/asfspec.aspx>.

* cited by examiner

*Primary Examiner* — William C Vaughn, Jr.
*Assistant Examiner* — Daniel Tekle
(74) *Attorney, Agent, or Firm* — Birch, Stewart, Kolasch & Birch, LLP

(57) ABSTRACT

A control information decoding section (102) decodes sets of control information contained in a stream. Further, a random access information analyzing section (101) carries out analysis of locations of random access points of media items contained in the stream, on the basis of the sets of control information. Still further, a management information generating section (103) generates management information for managing a plurality of random access points contained in the stream, on the basis of decoded versions of the sets of control information, which has been obtained by the control information decoding section (102), and the locations of the random access points obtained by the analysis performed by the random access information analyzing section (101). Then, the management information thus generated and the stream are recorded onto a storage medium (104). This makes it possible to quickly start playback in performing random-access playback of a stream into which control signals are inserted at regular intervals.

17 Claims, 14 Drawing Sheets

FIG. 6(a)

| ENTRY COUNT | ENTRY 1 | ENTRY 2 | ENTRY 3 | .... |

FIG. 6(b)

| FIRST ENTRY COUNT | ENTRY 1 | ENTRY 2 | ENTRY 3 | .... | SECOND ENTRY COUNT | ENTRY A | ENTRY B | ENTRY C | .... |

FIG. 6(c)

| CONTROL INFORMATION COUNT | CONTROL INFORMATION 1 | CONTROL INFORMATION 2 | CONTROL INFORMATION 3 | .... | ENTRY COUNT | ENTRY 1 | ENTRY 2 | ENTRY 3 | .... |

RECORDING APPARATUS, REPRODUCING APPARATUS, RECORDING/REPRODUCING APPARATUS, RECORDING PROGRAM AND STORAGE MEDIUM THEREOF, AND REPRODUCTION PROGRAM AND STORAGE MEDIUM THEREOF

TECHNICAL FIELD

The present invention relates to (i) a recording apparatus which records stream data such as broadcast data onto a storage medium and (ii) a playback apparatus which plays back video/audio data recorded on the storage medium.

BACKGROUND ART

In many cases, since the volume of video content in digital form is enormous without compression, the video content in digital form is compressed, before recorded, according to MPEG-2 video scheme (see "ISO 13818-2:2000, Generic coding of moving pictures and associated audio information: Video") or H.264 scheme (see "ITU-T Recommendation H.264 (03/05), Advanced video coding for generic audiovisual services"), for example.

In these compression schemes, it is, however, impossible to start playing back the content at any midpoint time thereof because interframe prediction is performed for achievement of higher compression ratios. Note that a frame at which playback can be started is termed keyframe (random access point), and the keyframe corresponds to I-picture in the MPEG-2 video scheme and corresponds to IDR picture in the H.264 scheme.

For special playback such as playback of content at some midpoint and fast-forward/fast-rewind playback, i.e. random access to a file, it is important to manage where the keyframe at what time is located in recorded data.

A file format including keyframe management information is, for example, ASF (Advanced Systems Format) disclosed in Non-patent document 1. In the ASF, a structure termed index object is provided in a file. By recording the location and time of the keyframe in the index object, convenience to carry out special playback increases.

The following will discuss the index object of the ASF and its use with reference to FIGS. 11, 12, and 13.

FIG. 11 is an explanatory view of the general structure of an ASF file. Reference numeral 1101 represents a header object, in which a common attribute in the entire file is recorded. Reference numeral 1102 represents a data object, in which compressed data of video and audio is stored. The data object is made up of a plurality of packets. Reference numeral 1103 represents one packet included in the data object 1102. All the packets are of fixed length. Generally, since one frame of compressed video image is larger than one packet, the video image is stored in many cases in such a manner that one frame is divided into a plurality of packets. As in the above case, division into packets is performed in a case where video and audio are stored at the same time. In the header object 1101, ID information is described for identifying a packet in which video frame is stored and a packet in which audio data is stored. Reference numeral 1104 represents an index object, which will be described in detail later. In the header object 1101, the location of the index object 1104 is recorded so that the index object can be easily searched for.

FIG. 12 is an explanatory view showing the general structure of the index object (herein termed simply "index object" although termed "simple index object" in Non-patent document 1). Reference numeral 1201 represents a time interval T between index entries. Reference numeral 1202 represents the total number N of index entries. Reference numeral 1203 represents a sequence of the index entries, number of which is equal to the total number N of index entries. The index entries are temporally arranged at regular intervals T, so that an index entry corresponding to a given time can be easily searched for. Reference numeral 1204 represents one index entry in the sequence of the index entries. The index entry is composed of a packet number field and a packet count field, which are represented by reference numerals 1205 and 1206, respectively. In the packet number field 1205 is stored a head packet number of a keyframe that is located at a point closest to a time indicated by the index entry. In the packet count field 1206 is stored the number of packets required for reconstruction of the keyframe concerned.

FIG. 13 is an explanatory view showing correspondence between index entries and video frames. Rectangles at the top of FIG. 13 represent video frames. Among them, rectangles with hatching represent keyframes, and rectangles without hatching represent frames other than the keyframes. A number line at the bottom of FIG. 13 represents time, and a time at which an index entry exists is indicated by black circles. As an example, take the case where playback is desired to be started after T×k seconds from the head of motion picture content. Since index entries exist at time intervals T, an index entry that exists after T×k seconds is an index entry 1301, which is a k+1th index entry from the head of the motion picture content. However, since no keyframe exist at a point in time corresponding to T×k seconds from the head of the motion picture content, the index entry 1301 indicates a keyframe 1302, which is closest to the point in time T×k seconds from the head of the motion picture content. More specifically, (a) a packet number of a packet in which the first keyframe 1302 is stored and (b) the total number of packets required for reconstruction of the keyframe 1302 are described in the index entry 1301. For playback, packets required for reconstruction of the keyframe 1302 are extracted by calculating the location of the packet in recorded data from the packet number, so that playback can be started at a time closest to time T×k.

[Non-Patent Document 1]"Advanced Systems Format (ASF) Specification, Revision 01.20.03", [online], December in 2004, Microsoft Corporation, [Searched on Apr. 15, 2005], Internet <URL: http://www.microsoft.com/windows/windowsmedia/format/asfspec.aspx>

DISCLOSURE OF INVENTION

Problem to be Solved by the Invention

In current digital broadcasting, video and audio are multiplexed for transmission according to the MPEG-2TS (Transport Stream) scheme (see "ISO 13818-1:2000, Generic coding of moving pictures and associated audio information: Systems") (hereinafter simply referred to as "TS scheme"). Regarding a stream in the TS scheme, video and audio are divided into TS packets of fixed length. Each of the TS packets has a PID (Packet ID), by which the type of data stored in the TS packet is identified.

The TS scheme is a multiplexing scheme for broadcasting, which allows for playback at some midpoint by channel switching or the like. Therefore, nothing corresponds to the header object of the ASF in the TS scheme. More specifically, the TS scheme has elements termed PMTs (Program Map Table) which are multiplexed into a stream at given intervals, instead of the header object of the ASF. In the PMTs, PIDs of video and audio are stored. A playback apparatus searches for and analyzes the PMTs, obtain the PIDs of the video and audio, and extracts the TS packets of the video and audio on the basis of the obtained PIDs to start playback. There is the possibility that information of the PMTs can be changed midway through the broadcasting, which requires analyzing latest PMTs all the time. As with other data, the PMTs are also stored in the TS packets.

However, when a broadcast in the TS scheme is recorded as it is in a file format similar to the ASF, there occurs the problem caused by unique characteristics of the PMT. That is, in the ASF, elements equivalent to PIDs of video and audio are stored in the header objects and values of the elements are unchanged in a file. On the contrary, in the TS, description of the PMT can be changed at a midpoint of a file, which makes it difficult to perform collective management using the header object.

This does not result in impossibility of playback since the PMTs are inserted into TS packets at regular intervals. However, in the random access using the index object, PIDs of audio and voice are unknown until a first PMT appears since the packets referred to by the index entries are packets of motion picture content, not packets of PMTs. This results in impossibility of playback starting from a keyframe whose time is closest to a target time.

The present invention has been attained in view of the above problem. An object of the present invention is to quickly start playback in performing random-access playback of a stream into which control signals are inserted at regular intervals.

Means for Solving the Problem

In order to solve the above problem, a recording apparatus of the present invention is a recording apparatus which records a stream onto a storage medium, the stream being made up of a plurality of packets and having sets of control information inserted therein at regular intervals, the recording apparatus including: a control information decoding section which decodes the control information; a random access information analyzing section which carries out analysis of locations of random access points of media items contained in the stream, on the basis of the control information; and a management information generating section which generates management information for managing a plurality of random access points contained in the stream, on the basis of the decoded control information and the locations of the random access points obtained by the analysis, wherein the recording apparatus records the stream and the generated management information onto the storage medium.

According to the above arrangement, the management information generating section generates the management information for managing the random access points on the basis of the control information and the locations of the random access points of the media items, which random access points are contained in the stream. Then, the recording apparatus records the thus generated management information and the stream onto the storage medium. This makes it possible to collectively manage and use the stream and the management information. Therefore, in performing random access playback of the stream recorded in this manner, it is possible to make an early playback start even when the thus recorded stream has control signals inserted therein at regular intervals.

In addition to the above arrangement, the recording apparatus of the present invention may be arranged so as to further include: a management information multiplexing section which multiplexes the management information with the packets contained in the stream, wherein the recording apparatus records onto the storage medium multiplexed information in which the management information is multiplexed with the packets.

In this case, the stream is recorded with the sets of control information added thereto. This eliminates the need for differentiating the random access point of the control information and the random access point of the media item. Moreover, for example, in a case where invalid data is added to each of the packets for the purpose of alignment between a sector size and a packet size, a recording area can be effectively used by recording onto the added area multiplexed information in which the management information is multiplexed with the packets.

Further, the recording apparatus of the present invention may be arranged such that the management information includes a plurality of entries, each of which includes information concerning the location of the random access point, and information concerning a playback time for the random access point.

According to the above arrangement, it is possible to carry out a quick analysis of a desired random access point on the basis of the information concerning the location of the random access point, and information concerning a playback time for the random access point, both of which information are included in the management information. The management information only needs to include entries the number of which is the same as the number of random access points contained in the stream. This makes it possible to reduce a size of the management information.

Still further, the recording apparatus of the present invention may be arranged such that the management information includes first entries and second entries, each of the first entries containing information concerning the location of the random access point, each of the second entries containing information that is in one-to-one correspondence with a playback time of the random access point.

According to the above arrangement, at the playback, the location of a random access point at which playback is to be started can be determined on the basis of a result of analysis on a random access point corresponding to a desired playback time by using the second entry that is in one-to-one correspondence with a playback time of a random access point. This makes it possible to quickly find information concerning the location of a desired random access point.

Yet further, the recording apparatus of the present invention may be arranged such that the management information includes PIDs indicating types of media items contained in the stream. Here, the media item is information other than the control information stored in each packet. The media item is video information and audio information, for example. The PID (Packet ID) is information indicating the type of each media item contained in the stream.

According to the above arrangement, decoding of the control information is not necessary to obtain the PID. This eliminates the need for a step of decoding the control signals in the control information decoding section.

Further, the recording apparatus of the present invention may be arranged such that the management information includes information concerning the location of the random access point, which is a size from a head of the stream to each of the random access points.

Still further, the recording apparatus of the present invention may be arranged such that the management information includes information concerning the location of the random access point, which is a packet number sequentially assigned to each packet contained in the stream, starting from a packet located at the head of the stream.

According to the above arrangement, the location of the packet corresponding to a random access point can be easily identified by the packet number.

Yet further, the recording apparatus of the present invention may be arranged such that the management information includes information concerning the location of the random access point, which is a difference between a size from the head of the stream to each random access point and a size from the head of the stream to another random access point adjacent to it.

According to the above arrangement, information concerning the location of the random access point is a difference between a size from the head of the stream to each random access point and a size from the head of the stream to another random access point adjacent to it. This makes it possible to reduce a size of the entire management information.

Further, the recording apparatus of the present invention may be arranged such that the management information includes information concerning the location of the random access point, which is a difference between a packet number, sequentially assigned to the packets contained in the stream, starting from a packet located at a head of the stream, of each random access point and a packet number of another random access point adjacent to it.

According to the above arrangement, the information concerning the location of the random access point is a difference between a packet number at each of the random access points and a packet number at another random access point adjacent to it. This makes it possible to reduce a size of the entire management information.

In order to solve the above problem, a playback apparatus of the present invention is a playback apparatus which reads a stream from a storage medium, the stream being made up of a plurality of packets and having sets of control information inserted therein at regular intervals, the playback apparatus including: a management information analyzing section which analyzes a location of random access point on the basis of management information, which is recorded with the stream onto the storage medium, for managing a plurality of random access points contained in the stream; a stream reading section which reads the stream recorded onto the storage medium, on the basis of the location of the random access point obtained by the analysis; a data classifying section which classifies the packets contained in the read stream into packets containing the control information and packets containing media items; and a media decoding section which decodes the packets containing the media items.

According to the above arrangement, analysis on the location of the random access point is carried out on the basis of the management information recorded with the stream onto the storage medium, and the control information can be quickly obtained from the stream on the basis of a result of the analysis. On this account, it is possible to quickly start playback even when the stream has control signals inserted therein at regular intervals.

In addition to the above arrangement, the playback apparatus may be arranged so as to include a management information separating section which separates from the stream the management information multiplexed into the stream.

According to the above arrangement, even when the management information is recorded in such a manner so as to be multiplexed into the stream, the management information and the stream are separated from each other. This makes it possible to quickly analyze the locations of the random access points on the basis of the separated management information.

Further, the playback apparatus may be arranged such that the management information analyzing section analyzes the location of the random access point on the basis of information concerning a playback time at the random access point, which is included in the management information.

According to the above arrangement, analysis on the information concerning the location of the random access point can be quickly carried out on the basis of the information concerning a playback time for the random access point, which information is included in the management information. This makes it possible to reduce a time required until playback is started.

Still further, the playback apparatus may be arranged such that the management information analyzing section analyzes a location of a random access point at which playback is to be started, on the basis of first entries and second entries both of which are included in the management information, each of the first entries containing information concerning the location of the random access point, each of the second entries containing information that is in one-to-one correspondence with a playback time of the random access point.

According to the above arrangement, a location of a random access point at which playback is to be started can be identified by (a) a result of the analysis of a random access point corresponding to a desired playback start time by using the second entries and (b) information concerning the locations of the random access points contained in the first entries. This eliminates the need for directly searching for the first entry corresponding to a target playback time, and makes it possible to easily find the location of a random access point on the basis of the second entry, thus allowing for making an early playback start.

Yet further, the playback apparatus may be arranged such that the management information analyzing section analyzes PIDs included in the management information and indicating types of media items contained in the stream, and the data classifying section classifies the packets contained in the stream, according to types of media items, on the basis of a result of the analysis carried out by the management information analyzing section.

According to the above arrangement, decoding of the control information is not necessary to obtain the PID. This can reduce a time required until playback is started.

Further, the playback apparatus may be arranged such that the management information analyzing section analyzes the location of the random access point on the basis of information included in the management information and indicating a size from the head of the stream to each of the random access points.

Still further, the playback apparatus may be arranged such that the management information analyzing section analyzes the location of the random access point on the basis of a product of a packet number sequentially assigned to each of the packets contained in the stream, starting from a packet at a head of the stream, and a size of each of the packets, the packet number being included in the management information.

According to the above arrangement, it is possible to carry out a quick analysis on the location of the random access point on the basis of (a) a packet number sequentially assigned to each of the packets contained in the stream, starting from a packet at a head of the stream, and (b) a size of each of the packets, the packet number being included in the management information.

Yet further, the playback apparatus may be arranged such that the management information analyzing section analyzes the location of the random access point on the basis of relative location information that is a difference between the size from the head of the stream to each of the random access points and the size from the head of the stream to another random access point adjacent to the each of the random access points, both of which sizes are included in the management information.

Further, the playback apparatus may be arranged such that the management information analyzing section analyzes the location of the random access point on the basis of a relative index value and a size of each of the packets, the relative index value being a difference between a packet number, sequentially assigned to the packets contained in the stream, starting from a packet located at a head of the stream, at each of the random access points and a packet number at another random access point adjacent to it.

According to the above arrangement, it is possible to quickly find a desired random access point.

Still further, the playback apparatus may be arranged so as to further include: a control information decoding section which decodes the sets of control information contained in the stream and extracts PIDs indicating the types of media items contained in the stream on the basis of the decoded sets of control information, wherein the data classifying section classifies the packets contained in the stream which has been read by the stream reading section, according to types of media items, on the basis of the PIDs extracted by the control information decoding section.

According to the above arrangement, even when the stream contains plural types of media items, it is possible to appropriately classify the media items contained in the stream.

A recording/playback apparatus of the present invention is arranged so as to include the above-mentioned recording apparatus and the above-mentioned playback apparatus.

According to the above arrangement, analysis on the location of the random access point is carried out at the playback on the basis of the management information, which has been recorded with the stream onto the storage medium at the recording, and the control information can be quickly obtained from the stream on the basis of the result of the analysis. This makes it possible to quickly play back the stream recorded onto the storage medium.

In order to solve the above problem, a recording method of the present invention is a recording method of recording a stream onto a storage medium, the stream being made up of a plurality of packets and having sets of control information inserted therein at regular intervals, the recording method comprising: a control information decoding step of decoding the control information; a random access information analyzing step of carrying out analysis on locations of random access points of media items contained in the stream, on the basis of the control information; a management information generating step of generating management information for managing a plurality of random access points contained in the stream, on the basis of the decoded control information and the locations of the random access points obtained by the analysis; and a recording step of recording the stream and the generated management information onto the storage medium.

According to the above recording method, the management information for managing the random access points is generated on the basis of the control information contained in the stream and the locations of the random access points of the media items. Then, the thus generated management information and the stream are recorded onto the storage medium. This makes it possible to collectively manage and use the stream and the management information. Therefore, in performing random access playback of the stream recorded in this manner, it is possible to make an early playback start even when the stream has control signals inserted therein at regular intervals.

In order to solve the above problem, a playback method of the present invention is a playback method of reading a stream from a storage medium, the stream being made up of a plurality of packets and having sets of control information inserted therein at regular intervals, the playback method comprising: a management information analyzing step of analyzing a location of a random access point on the basis of management information, which is recorded with the stream onto the storage medium, for managing a plurality of random access points contained in the stream; a stream reading step of reading the stream recorded onto the storage medium, on the basis of the location of the random access point obtained by the analysis; a data classifying step of classifying the packets contained in the read stream into packets containing the control information and packets containing media items; and a media decoding step of decoding the packets containing the media items.

According to the above playback method, analysis on the locations of the random access points is carried out on the basis of the management information recorded with the stream onto the storage medium, and the control information can be quickly obtained from the stream on the basis of a result of the analysis. On this account, it is possible to quickly start playback even when the stream has control signals inserted therein at regular intervals.

A recording program of the present invention is the one for causing a computer to execute processes performed in the foregoing steps of the above-mentioned recording method. By causing the computer to read this program, it is possible to cause the computer to realize the processes performed in the foregoing steps.

Further, by recording the recording program onto a computer-readable storage medium, it becomes possible to easily store and distribute the recording program. Still further, by causing a computer to read the storage medium, it is possible to perform the processes performed in the foregoing steps of the recording method of the present invention.

A playback program of the present invention is the one for causing a computer to execute processes performed in the foregoing steps of the above-mentioned playback method. By causing the computer to read this program, it is possible to cause the computer to realize the processes performed in the foregoing steps.

Further, by recording the playback program onto a computer-readable storage medium, it becomes possible to easily store and distribute the playback program. Still further, by causing a computer to read the storage medium, it is possible to perform the processes performed in the foregoing steps of the playback method of the present invention.

BRIEF DESCRIPTION OF DRAWINGS

FIG. 6(a) is an explanatory view of an example of the format of the management information recorded onto the storage medium by the recording apparatus according to an embodiment of the present invention.

FIG. 6(b) is an explanatory view of an example of the format of the management information recorded onto the storage medium by the recording apparatus according to an embodiment of the present invention.

FIG. 6(c) is an explanatory view of an example of the format of the management information recorded onto the storage medium by the recording apparatus according to an embodiment of the present invention.

EXPLANATIONS OF REFERENCE NUMERALS

Figure 1:
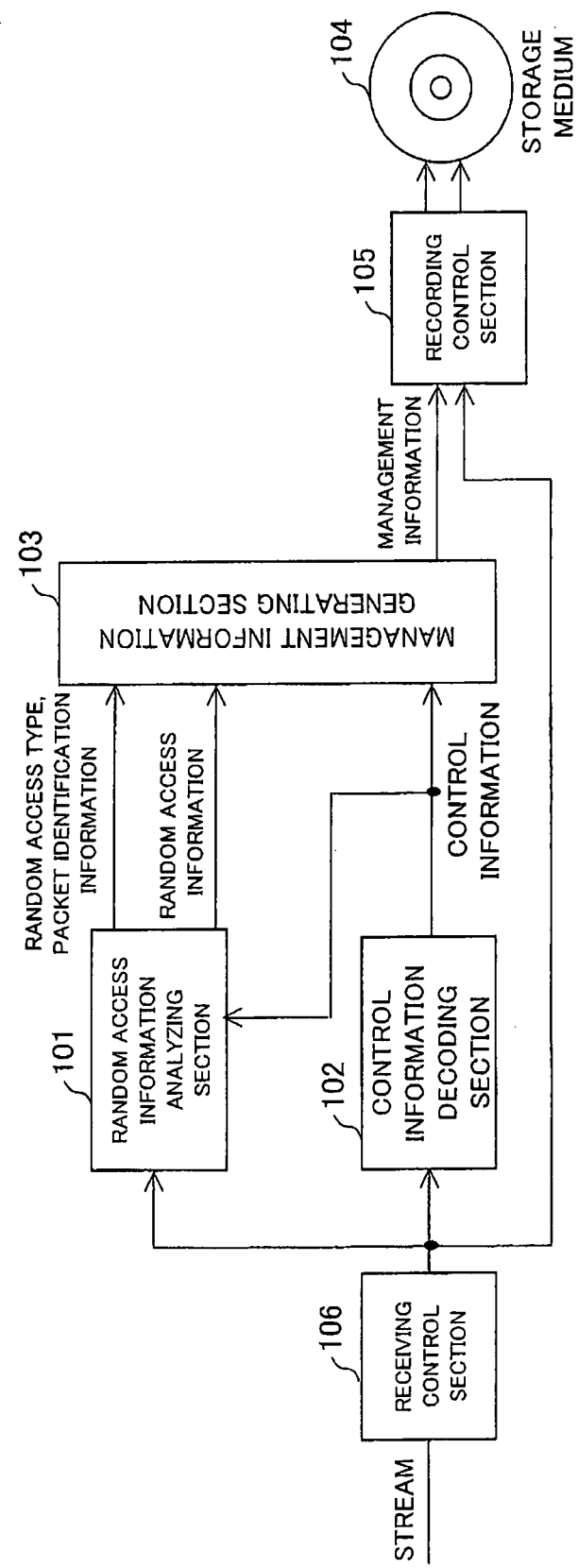
FIG. 1 is a block diagram schematically illustrating the configuration of a recording apparatus according to an embodiment of the present invention.

100 Data recording apparatus (recording apparatus)
101 Random access information analyzing section
102 Control information decoding section
103 Management information generating section
104 Storage medium
105 Recording control section
106 Reception control section
800, 800b Data playback apparatus (playback apparatus)
802 Management information analyzing section
803 Stream reading section
804 Data classifying section
805 Control information decoding section
806 Video decoding section
807 Audio decoding section
808 Instruction inputting section

BEST MODE FOR CARRYING OUT THE INVENTION

First Embodiment

The following will describe a recording apparatus according to an embodiment of the present invention.

(Configuration of Data Recording Apparatus 100)

FIG. 1 is a block diagram illustrating the configuration of a data recording apparatus 100 that is a recording apparatus according to the present embodiment. As illustrated in FIG. 1, the data recording apparatus 100 includes a random access information analyzing section 101, a control information decoding section 102, a management information generating section 103, a recording control section 105, and a reception control section 106. Note that the data recording apparatus 100 receives a stream supplied from an external entity to the reception control section 106, and records onto a storage medium 104 the received stream and management information (described in details later) generated on the basis of the stream.

The reception control section 106 controls receiving means (not shown) to receive a stream from an external entity. The stream received by the data recording apparatus 100 is made up of, for example, compressed video data and other data and realized by a plurality of packets. The reception control section 106 supplies the received stream to the random access information analyzing section 101, the control information decoding section 102, and the recording control section 105.

The random access information analyzing section 101 receives the stream, which is made up of a plurality of packets, and analyzes header information and others of each of the packets by using control information, which will be described later. As a result of the analysis, the random access information analyzing section 101 outputs to the management information generating section 103 sets of random access information, random access types, and sets of packet identification information. The random access information indicates whether the packet includes randomly accessible data, and the packet identification information is information for identifying the packet.

The control information decoding section 102 extracts only packets including sets of control information from the incoming stream, and decodes the extracted packets to generate decoded versions of the control information. The control information decoding section 102 outputs the sets of control information thus generated to the random access information analyzing section 101 and the management information generating section 103.

The management information generating section 103 generates management information on the basis of the sets of random access information, the random access types, the sets of packet identification information, and the sets of control information. Then, the management information generating section 103 outputs the generated management information to the recording control section 105.

The recording control section 105 records onto the storage medium 104 (a) the management information generated by the management information generating section 103 and (b) the stream. Note that the storage medium 104 may be installed in the data recording apparatus 100 or may be separable from the data recording apparatus 100. Examples of the storage medium 104 are a tape, such as a magnetic tape and a cassette tape; a magnetic disk, such as a flexible disk and a hard disk; a disc such as a CD/MO/MD/DVD; a card, such as an IC card (including memory card); and a semiconductor memory, such as a mask ROM, an EPROM (Erasable Programmable Read Only Memory), an EEPROM (Electrically Erasable Programmable Read Only Memory), or a flash ROM. The management information and the stream may be outputted (transmitted) to other device through a transmission medium (which holds data in a flowing manner), such as a communication network (connected via wired lines or by wireless) including the Internet. In other words, in the data recording apparatus 100, the management information and the stream are not necessarily recorded onto the storage medium 104. Alternatively, these sets of information may be transmitted via a communication line, for example. In this case, the recording control section 105 outputs the management information and the stream to other device via a communication line.

(Operation of Data Recording Apparatus 100)

Next, operations of the sections provided in the data recording apparatus 100 will be described in detail. The following description assumes that a stream mainly includes two types of information, control information and video frame. However, the types of the information included in the stream are not limited to these sets of information. For example, in addition to the control information and the video frame, two or more types of media items (information) such as audio frame, BML document, and still image may be included in the stream.

Figure 14:
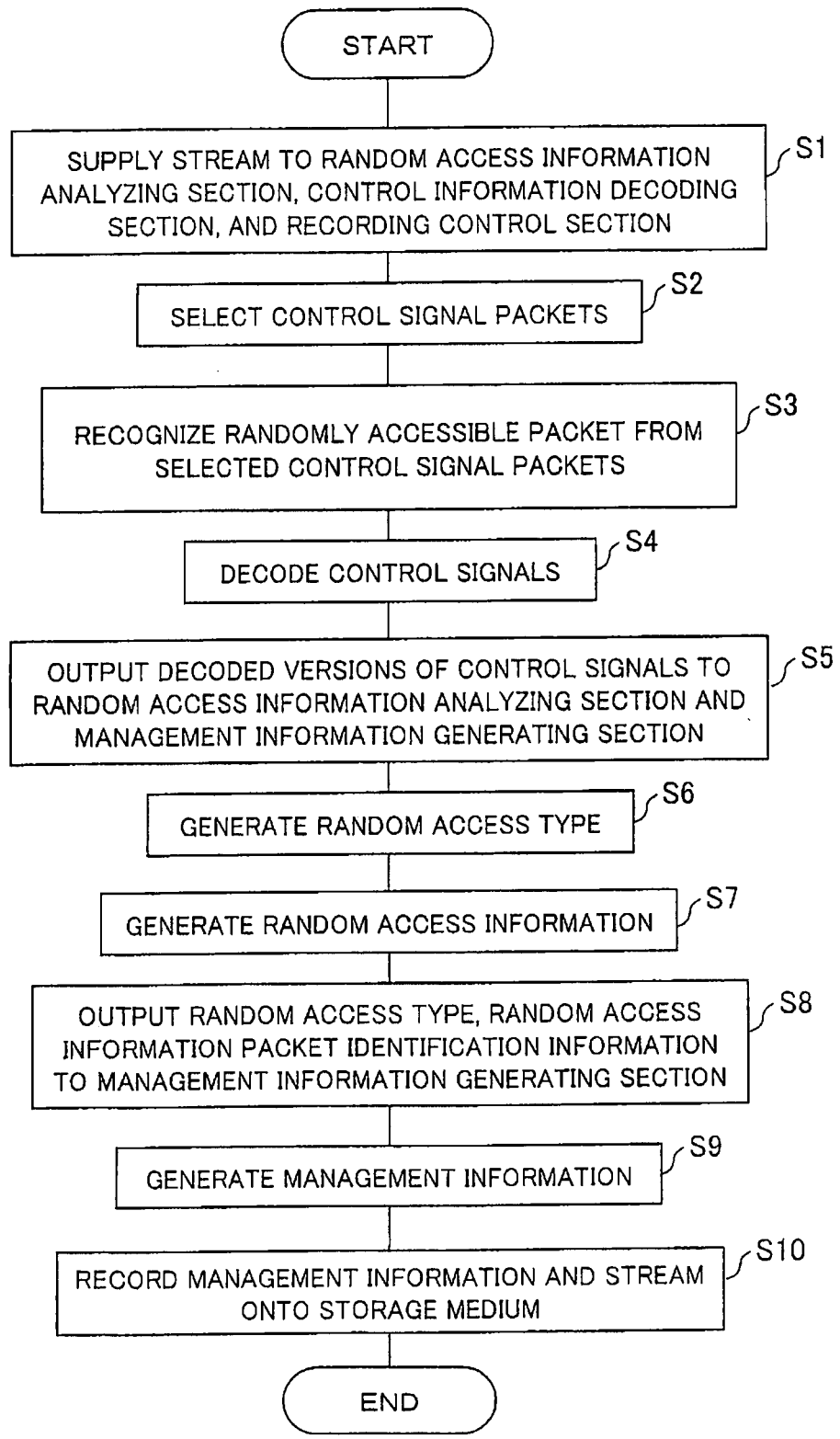
FIG. 14 is a flowchart showing a flow of the processes in the recording apparatus according to an embodiment of the present invention.

FIG. 14 is a flowchart showing a flow of the processes in the data recording apparatus 100. As illustrated in FIG. 14, the reception control section 106 supplies the incoming stream to the random access information analyzing section 101, the control information decoding section 102, and the recording control section 105 (S1).

Figure 2:
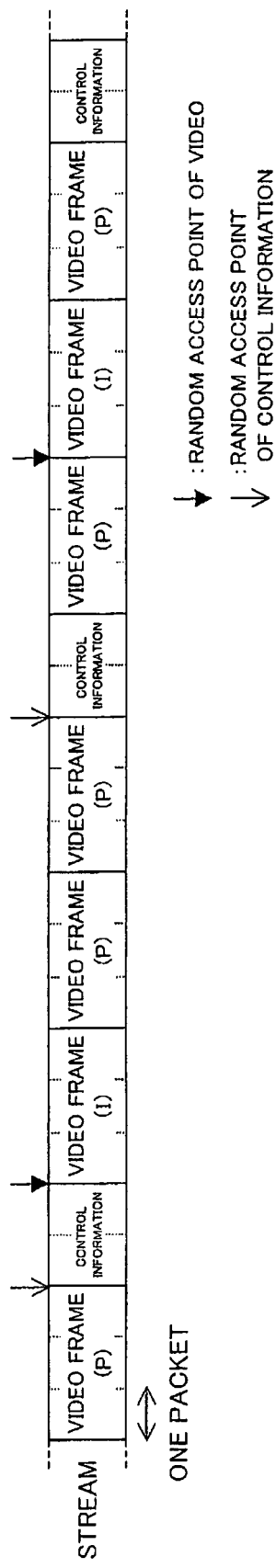
FIG. 2(a) is an explanatory view of the structure of a stream supplied to the recording apparatus according to an embodiment of the present invention.
FIG. 2(b) is an explanatory view of the structure of each packet in the stream illustrated in FIG. 2(a).
Figure 2:
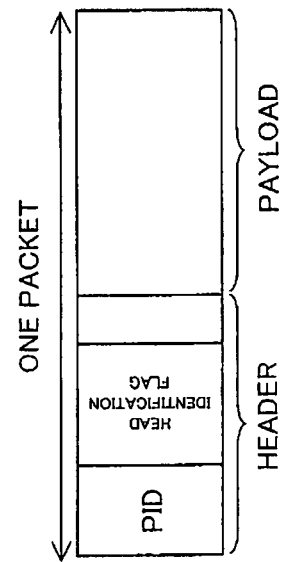

FIG. 2(*a*) is an explanatory view of the structure of a stream supplied to the data recording apparatus 100 (stream received by the data recording apparatus 100). FIG. 2(*b*) is an explanatory view of each packet contained in the stream illustrated in FIG. 2(*a*).

As illustrated in FIG. 2(*a*), the stream supplied to the data recording apparatus 100 is made up of a plurality of fixed-length packets which are coupled to each other, and the stream contains therein various kinds of information such as video frame and control information. As illustrated in FIG. 2(*b*), each of the packets is made up of a header and a payload into which compressed data is stored. The header contains PID (Packet ID) therein. To the PID (value of PID), a number corresponding to a type of the compressed data contained in the payload is assigned. That is, the packets containing the compressed data of a kind have identical PIDs. Accordingly, the data recording apparatus 100 or a playback apparatus that plays back the stream can extract sets of compressed data of a kind by selecting packets on the basis of the value of the PID.

The header contains therein head identification information and others. The head identification information indicates whether the packet contains a point, such as video keyframe, at which decoding can be started in the middle of the compressed data. In FIG. 2(*a*), a packet indicated by an arrow is recognized as a randomly accessible packet (random access point) from the head identification information. Examples of such a packet include a MPEG-2 TS (Transport Stream) packet. In the MPEG-2 TS packet, payload_unit_start_indicator corresponds to the head identification information.

The control information decoding section 102 selects packets having a predetermined PID for control information from among packets contained in the incoming stream (S2). That is, the data recording apparatus 100 is provided with storage means (not shown) which stores therein a PID (PID for control information) assigned to a packet in which the payload contains the compressed data as the control information. The control information decoding section 102 selects packets having a PID that is identical with the PID stored in the storage means, as packets for control information (packets containing the control information in the payload).

Subsequently, the control information decoding section 102 recognizes randomly accessible packets with reference to the head identification information (S3). That is, the control information decoding section 102 refers to the head identification information contained in the packets which have been selected in S2 as the packets for control information, and recognizes randomly accessible packets from the selected packets.

Then, the control information decoding section 102 makes access to the randomly accessible packets (random access point) which have been recognized in S3, to decode the sets of control information, starting from the randomly accessible packets (S4).

Figure 3:
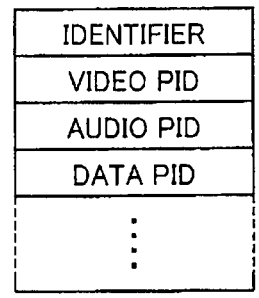
FIG. 3 is an explanatory view of an example of control information decoded by the recording apparatus according to an embodiment of the present invention.

FIG. 3 is an explanatory view of an example of the control information decoded by the control information decoding section 102. As illustrated in FIG. 3, the control information is made up of an identifier indicating the control information, PIDs of media items such as video, audio, and data (PIDs of packets including the media items), and others. Examples of the control information include PMT (Program Map Table) of MPEG-2 TS.

Then, the control information decoding section 102 outputs the decoded versions of control information to the random access information analyzing section 101 and the management information generating section 103 (S5).

The random access information analyzing section 101 generates the random access type (random access type information) by using the PIDs of the media items contained in the stream (S6). That is, media items of the packets contained in the incoming stream (or packets corresponding to the random access points) are identified on the basis of the media PIDs which are contained in the sets of control information decoded by the control information decoding section 102, so that the random access type indicative of types of the media items is generated.

Then, the random access information analyzing section 101 generates the sets of random access information (S7). The random access information indicates a result of the determination as to whether the packet contains randomly accessible data. It should be noted that in a case where a packet as the random access point can be determined by the head identification information, the head identification information may be directly used as the random access information. In a case where a packet as the random access point cannot be determined only by the head identification information, the packet as the random access point should be determined by a method suitable for stream data compression scheme or the like. For example, in a case where H.264 is used in digital broadcasting, the head identification information indicates whether a frame head is included, not indicates a random access point. In this case, with reference to a value of Primary_Pic_Type included in AUD (Access Unit Delimiter) NAL (Network Adaption layer) unit that is located at each frame head of H.264 stream, whether or not it holds that the value of Primary_Pic_Type and the head identification information are 0 and 1, respectively, is determined. As a result of the determination, it is determined whether the frame is a keyframe, i.e. whether a random access point is included.

Next, the random access information analyzing section 101 outputs to the management information generating section 103 the random access types having been generated in S6, the sets of random access information having been generated in S7, and the sets of packet identification information (S8). The packet identification information is information for identifying the packet. Examples of the packet identification information include a playback time of a packet, an index value uniquely assigned to the packet, the number of bytes from the head of the stream to the packet, and the number of bytes or an index value from a previous packet or a previous random access point to the packet.

The management information generating section 103 generates management information on the basis of the sets of control information having been supplied from the control information decoding section 102, as well as the random access types, the sets of random access information, and the sets of packet identification information all of which have been supplied from the random access information analyzing section 101, and outputs the generated management information to the recording control section 105 (S9). The management information generated by the management information generating section 103 includes sets of information for managing the random access points included in the stream. In a playback apparatus that plays back stream recorded by the data recording apparatus 100, it is possible to start playback of the stream at any midpoint of the stream by using information (hereinafter referred to as "entry") for managing these sets of random access information contained in the management information.

Figure 4:
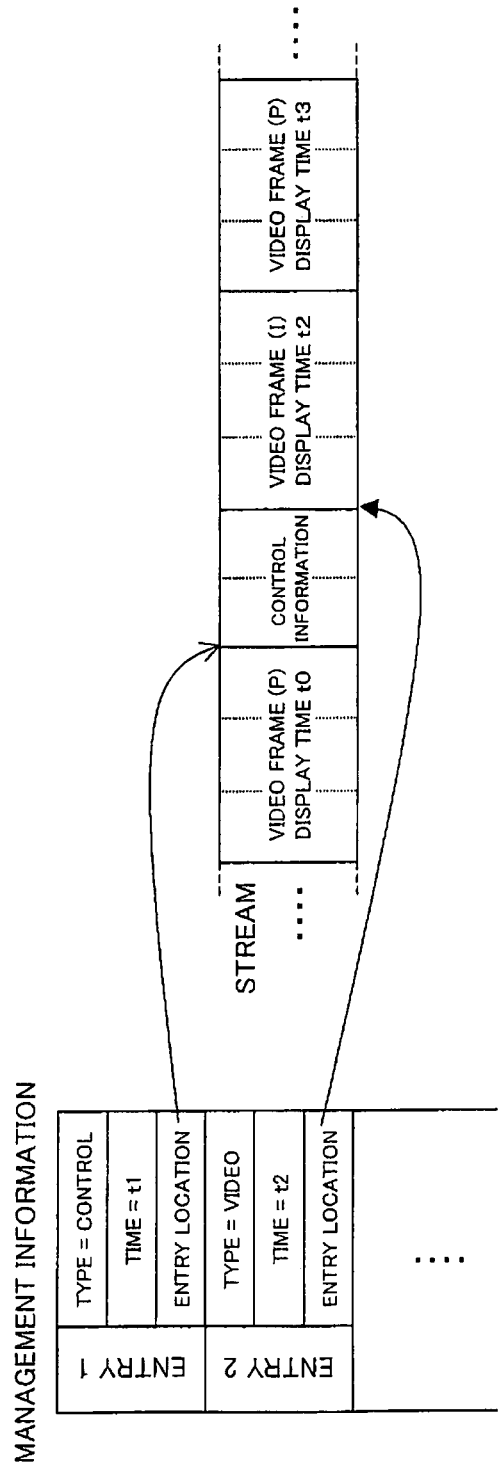
FIG. 4 is an explanatory view of an example of entries that are included in the management information generated by the recording apparatus according to an embodiment of the present invention, and a relation between the entries and random access points in the stream.

FIG. 4 is an explanatory view showing an example of entries included in the management information, and a relation between the entries and random access points in the stream.

In the example shown in FIG. 4, each of the entries contained in the management information includes the following sets of information: "type"; "time"; and "entry location". Each of the entries is in one-to-one correspondence with to a random access point in the stream. In the example shown in FIG. 4, entry 1 corresponds to a random access point of control information in the stream, and an entry location of entry 2 corresponds to a random access point of video frame in the stream.

The "type" is information indicative of a type of a random access point corresponding to the entry. In the example shown in FIG. 4, the type corresponds to the control information in the entry 1, and the type corresponds to video frame in the entry 2.

The "time" is information indicative of a playback time of a media item corresponding to the entry. In the example shown in FIG. 4, a playback time t2 is stored in the entry 2 corresponding to video frame of display time t2.

Note that the control information does not include information corresponding to a playback time, but a size of one entry can be of fixed length by setting an appropriate value. For example, in the entry 1 in FIG. 4, a time t1 that satisfies t0<t1<t2 is used where t0 and t2 are respective playback times of frames which are located previous and subsequent to the control information corresponding to the entry. However, a time setting method in the entry for the control frame is not limited to this. Moreover, to reduce a size of the entire management information, this field (i.e. "time") may not be recorded when the type is control information.

As an example of the playback times t0 and t2, PTSs (Presentation Time Stamp) can be directly used in the case of MPEG-2TS. Moreover, the Moreover, the playback times t0 and t2 may be relative times from the PTS located at the head of the stream to be recorded.

The "entry location" is information indicative of a location of the corresponding packet in the stream. The "entry location" can be, for example, an index value uniquely assigned to each of the packets starting from a packet located at the head of a recorded stream (packet number sequentially assigned to each of the packets contained in the stream, starting from a packet located at the head of the stream), or the number of bytes from the head of the stream.

Further, instead of the location distance from the head of the stream, the entry location may be indicated by, for example, the number of bytes that equals to difference between the previous entry and the entry concerned (difference between a size from the head of the stream to each of the random access points and the size from the head of the stream to another random access point adjacent to the each of the random access points). Alternatively, the entry location may be indicated by an index value that equals to difference between the previous entry and the entry concerned (difference between a packet number of each of the random access points and a packet number of another random access point adjacent to the each of the random access points, out of packet numbers (index values) sequentially assigned to the packets contained in the stream, starting from a packet located at the head of the stream). Thus, it is possible to reduce a size of the entire management information by using difference in the number of bytes from the adjacent random access point (relative location information) or difference in index value (relative index value).

In the case of the "type"="control information", a PID described in the control information may be directly described in the "entry location" field, instead of storing the location of the control information therein. In this case, a process of searching for and decoding the head of the control information to obtain the PID can be omitted.

By arranging entries in such a manner, it is possible to quickly obtain (a) control information corresponding to a specified time and (b) the location of a first video frame in the stream, and to reduce the size of management information.

Figure 5:
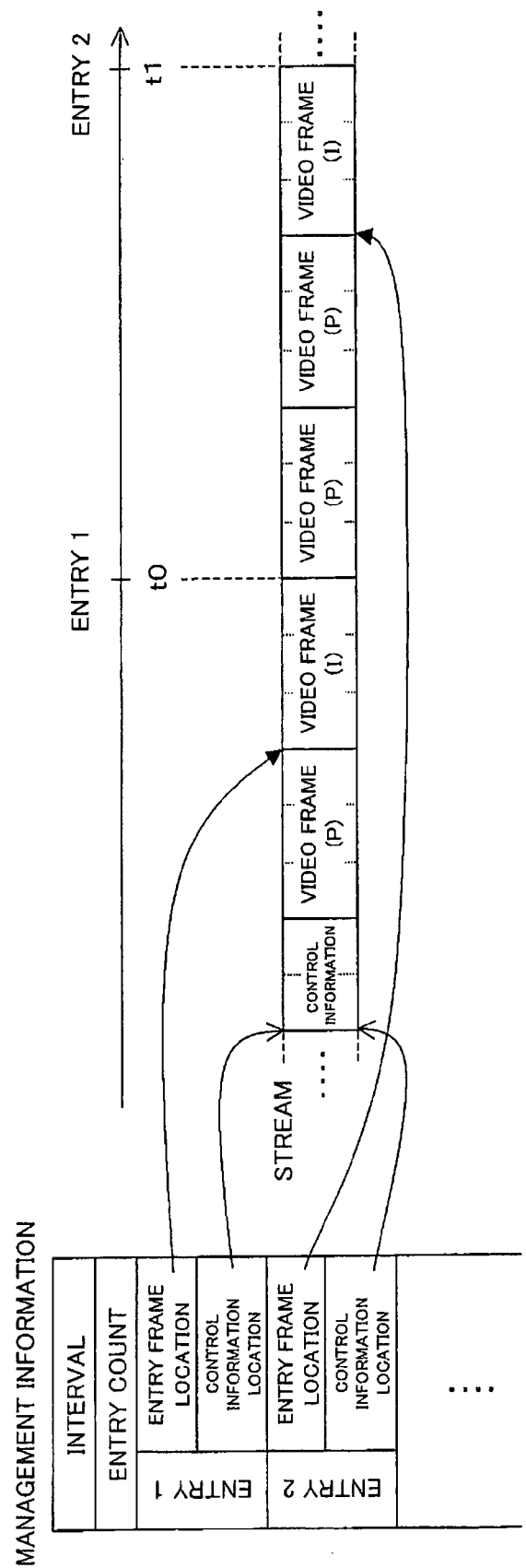
FIG. 5 is an explanatory view of another example of the management information generated by the recording apparatus according to an embodiment of the present invention, and a relation between the entries and random access points in the stream.

It should be noted that the arrangement of entries included in the management information are not limited to the arrangement shown in FIG. 4. FIG. 5 illustrates another example of the arrangement of entries included in management information.

Management information shown in FIG. 5 includes interval, entry count, entries 1, 2, .... Each of the entries includes sets of information, entry frame location and control information location.

In the example shown in FIG. 5, one entry is provided at each of points in time located at regular time intervals, starting from the head of a stream recorded as in the ASF format. More specifically, in a case where there is a stream shown at the lower right of FIG. 5 for times t0, t1 ... at regular intervals as shown at the upper right of FIG. 5, information indicative of a random access point on the stream, corresponding to each of the times, is stored in the entry, as indicated on the stream by an arrow.

The "interval" is information indicative of a time interval of times t0 and t1 .... The "entry frame location" in each entry is information indicative of the location of a packet which includes video frame corresponding to the entry. Further, the "control information location" is information indicative of the location of a packet which includes control information corresponding to the entry. As in the case of FIG. 4, information indicative of the entry frame location and the control information location may be, for example, the number of bytes from the head of the stream, the index value of a packet, and difference in the number of bytes or index value between entries.

By arranging entries in such a manner, it is possible to easily find an entry location corresponding to a target time, without searching for a target entry with reference to a display time in the entry. On this count, it is possible to more quickly obtain a target random access point, as compared with the case where the entries illustrated in FIG. 4 are used.

Regarding the control information, as in the case of FIG. 4, a PID or the like described in the control information may be directly described, instead of the control information location. In this case, a process of searching for and decoding the head of the control information to obtain the PID can be omitted.

If a value of the "interval" is smaller than an interval between random access points, the chance of occurrence of identical random access points at different times increases. In other words, the chance that identical entries appear plural times in the management information increases. This increases the size of the management information. In view of this, the entry illustrated in FIG. 5 and the entry illustrated in FIG. 4, i.e. the entry that is in a one-to-one correspondence with a random access point may be combined, and identification information of the entry (first entry) that is in one-to-one correspondence with a random access point may be stored, instead of the locations of control information and a random access point which are described in the entry. The identification information of the entry in one-to-one correspondence with a random access point can be, for example, an index of the entry concerned and the number of bytes from the head of the entry. This makes it possible to relatively restrain increase of the size of the management information, even if a value of the "interval" is smaller than an interval between random access points. Further, at the playback, a random access point corresponding to a desired playback time is analyzed by using "interval" (second entry including a pointer to the first entry) that is in one-to-one correspondence with a playback time of a random access point. On the basis of a result of the analysis and the first entry, it is possible to determine the location of a random access point at which playback is to be started. This makes it possible to quickly find information of the location of a desired random access point.

In the case of digital broadcasting, no PMT corresponding to the control information may exist in the stream during broadcast suspension time or the like. In this case, when a place to reference to the control information is the head of a previous PMT, the broadcast suspension state cannot be expressed. In view of this, in a case where there is no corresponding control information, NULL (=0) or other predetermined value should be recorded in the management information to be regarded as indicating broadcast suspension state so that processing in the broadcast suspension state can be performed.

The recording control section 105 which has received the management information from the management information generating section 103 records onto the storage medium 104 (i) the received management information and (ii) the stream supplied from the reception control section 106 (S10).

A format of the management information recorded onto the storage medium 104 is considered to be the ones illustrated in FIGS. 6(*a*) through 6(*c*), for example.

An exemplary format illustrated in FIG. 6(*a*) is such that entry count is first stored and all entries are then stored in sequence. The entries stored are considered to be the ones that have been previously described with reference to FIGS. 4 and 5.

An exemplary format illustrated in FIG. 6(*b*) is such that first entry count is stored first, all entries regarding the first entry are stored in sequence, second entry count is stored, and then all entries regarding the second entry are stored in sequence. That is, FIG. 6(*b*) illustrates an exemplary format of management information in a case where a random access point is obtained by using two kinds of entries in such a manner that one entry (e.g. first entry) refers to another entry (e.g. second entry) or in other manner. For example, the following method is considered: the entries described with reference to FIG. 5 are used as the first entries illustrated in FIG. 6(*b*), and the entries described with reference to FIG. 4 are used as the second entries illustrated in FIG. 6(*b*).

An exemplary format illustrated in FIG. 6(*c*) is such that control information count is stored, all sets of control information (entries regarding the control information) are stored in sequence, entry count other than the control information count is stored, and then all entries other than the entries regarding the control information are stored in sequence. That is, the exemplary format illustrated in FIG. 6(*c*) is such that all sets of control information regarding the stream concerned are first arranged, and then entries (e.g. entries in FIG. 4) other than the sets of control information are arranged. In this arrangement, control information index equivalent to the respective sets of information in the "control information locations" of the entries is recorded at the head of the management information. This omits the process of searching for a first set of control information and decoding the first set of control information and its following sets of control information, and eliminates the need for storing identical sets of control information. This makes it possible to reduce the size of the management information. The format illustrated in FIG. 6(*c*) can be regarded as a derivative of the format illustrated in FIG. 6(*a*).

Figure 7:
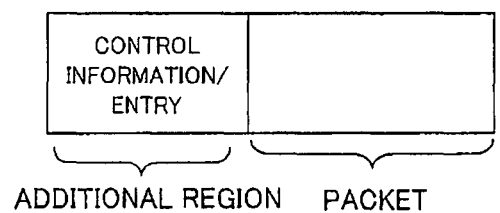
FIG. 7 is an explanatory view of an example of a packet recorded onto the storage medium by the recording apparatus according to an embodiment of the present invention.

In some cases, invalid data is added to each of packets for alignment on the ground of a sector size or the like in recording the packets onto the storage medium 104. In such cases, control information such as PID may be written in an additional region, as illustrated in FIG. 7. This can be realized with the arrangement illustrated in FIG. 1, for example, in the following manner: A management information multiplexing section (not shown) is provided at the previous stage of the recording control section 105, which records the stream and the management information onto the storage medium 104, so that the management information multiplexing section multiplexes the stream with the management information. This arrangement allows for effective use of an invalid region (conventionally, additional region for alignment) and makes it possible to quickly obtain PIDs of video and audio, thus making an early playback start. Moreover, this arrangement allows the control information to be recorded in such a manner so as to be added to the stream. This eliminates the need for differentiating a random access point of the control information and a random access point of the media item.

As described above, the data recording apparatus 100 according to the present embodiment is such that: the control information decoding section 102 decodes sets of control information contained in a stream; the random access information analyzing section 101 analyzes the locations of random access points of media items contained in the stream, by using the sets of control information; the management information generating section 103 generates management information for managing a plurality of random access points contained in the stream, on the basis of decoded versions of the sets of control information obtained by the control information decoding section 102 and the locations of the random access points analyzed by the random access information analyzing section 101. Then, the management information thus generated is recorded with the stream on the storage medium 104.

This makes it possible to collectively manage and use the stream and the management information. Thus, at random-access playback of the thus recorded stream, the playback is early started even if control signals are inserted into the stream at regular intervals.

Second Embodiment

The following will describe a playback apparatus according to an embodiment of the present invention.

(Configuration of Data Playback Apparatus)

Figure 8:
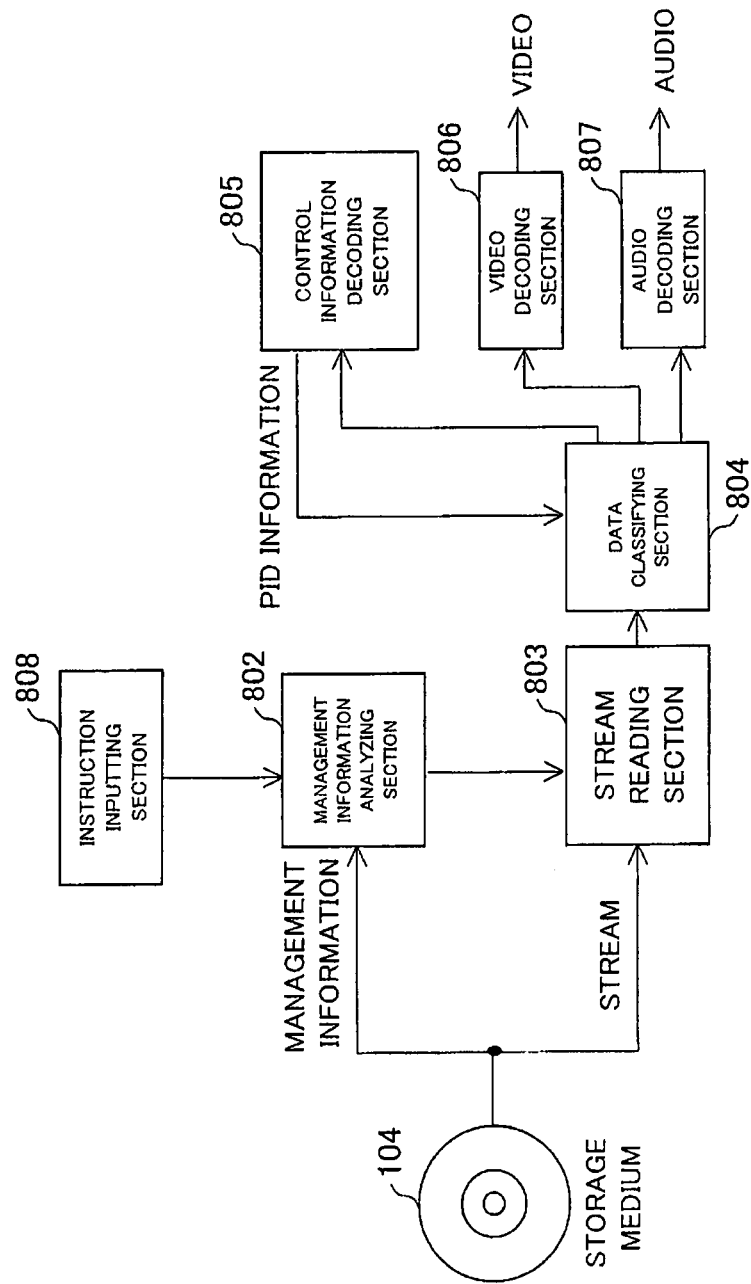
FIG. 8 is a block diagram schematically illustrating the configuration of a playback apparatus according to an embodiment of the present invention.

FIG. 8 is a block diagram illustrating the configuration of a data playback apparatus 800 that is a playback apparatus according to the present embodiment. It should be noted that the data playback apparatus 800 reproduces the storage medium 104 onto which the stream and the management information are recorded by the data recording apparatus 100 described in First Embodiment.

As illustrated in FIG. 8, the data playback apparatus 800 includes a management information analyzing section 802, a stream reading section 803, a data classifying section 804, a video decoding section (first media decoding section) 806, an audio decoding section (second media decoding section) 807, and an instruction inputting section 808.

The management information analyzing section 802 reads out management information recorded onto the storage medium 104, and then analyzes random access information and others from the read management information. The management information analyzing section 802 outputs a result of the analysis to the stream reading section 803.

The stream reading section 803 reads out the stream recorded onto the storage medium 104, according to instructions from the management information analyzing section 802 (analysis result of the management information analyzing section 802). Also, the stream reading section 803 outputs the read stream to the data classifying section 804.

The data classifying section 804 classifies packets contained in the stream read by the stream reading section 803 (separates packets including compressed data of video and audio and control information from the stream) by using the PID information supplied from the control information decoding section 805 which will be described later.

The control information decoding section 805 decodes packets including control information and acquires information such as PIDs of audio and video. Also, the control information decoding section 805 outputs the acquired PID information to the data classifying section 804, as described previously.

The video decoding section 806 decodes video compressed data classified by the data classifying section 804, and then displays it on video outputting means (not shown) such as a display. The audio decoding section 807 decodes audio compressed data classified by the data classifying section 804, and then outputs it to audio outputting means (not shown) such as a speaker. The above description assumes that video and audio are decoded. However, this is not the only possibility. Alternatively, either video or audio may be decoded. The present embodiment may be arranged so as to include a decoding section for decoding other media items such as still image and data, for example.

The instruction inputting section 808 accepts (a) an instruction regarding a point at which playback is to be started and (b) input regarding playback start instruction from a user, and then transfers a signal corresponding to the input instruction to the management information analyzing section 802. The construction of the instruction inputting section 808 is not particularly limited. The instruction inputting section 808 may be, for example, a touch panel, a keyboard, a mouth pointer, a pen input device, or a jog dial. The user may specify a playback start point in accordance with information displayed on display means (not shown). For example, the user operates a seek bar displayed on the display means by means of a mouth pointer to specify the playback start point.

The data playback apparatus 800 starts playback according to instructions regarding playback start point, inputted by the user through the instruction inputting section 808. The user can set so that playback will be started (restarted) from a point at which playback is suspended last time (playback suspension point), or the user can instruct so that playback will be started at a point that the user selects by means of a seek bar or the like. The user can instruct so that playback will be started from the head of a file (stream). That is, in the data playback apparatus 800, playback can be started at any point in a file (stream) according to user's instructions. "Starting playback at any point in a file" herein means, for example, that information regarding a point at which playback was suspended last time is stored so that playback will be restarted at that point, or that playback is started at a point selected by the user by means of a seek bar. Starting playback at the head of a file is also one of special cases of "starting playback at any point in a file", and can be realized by the same operations as those in the above cases.

(Playback Start Operation of Data Playback Apparatus 800)

Figure 15:
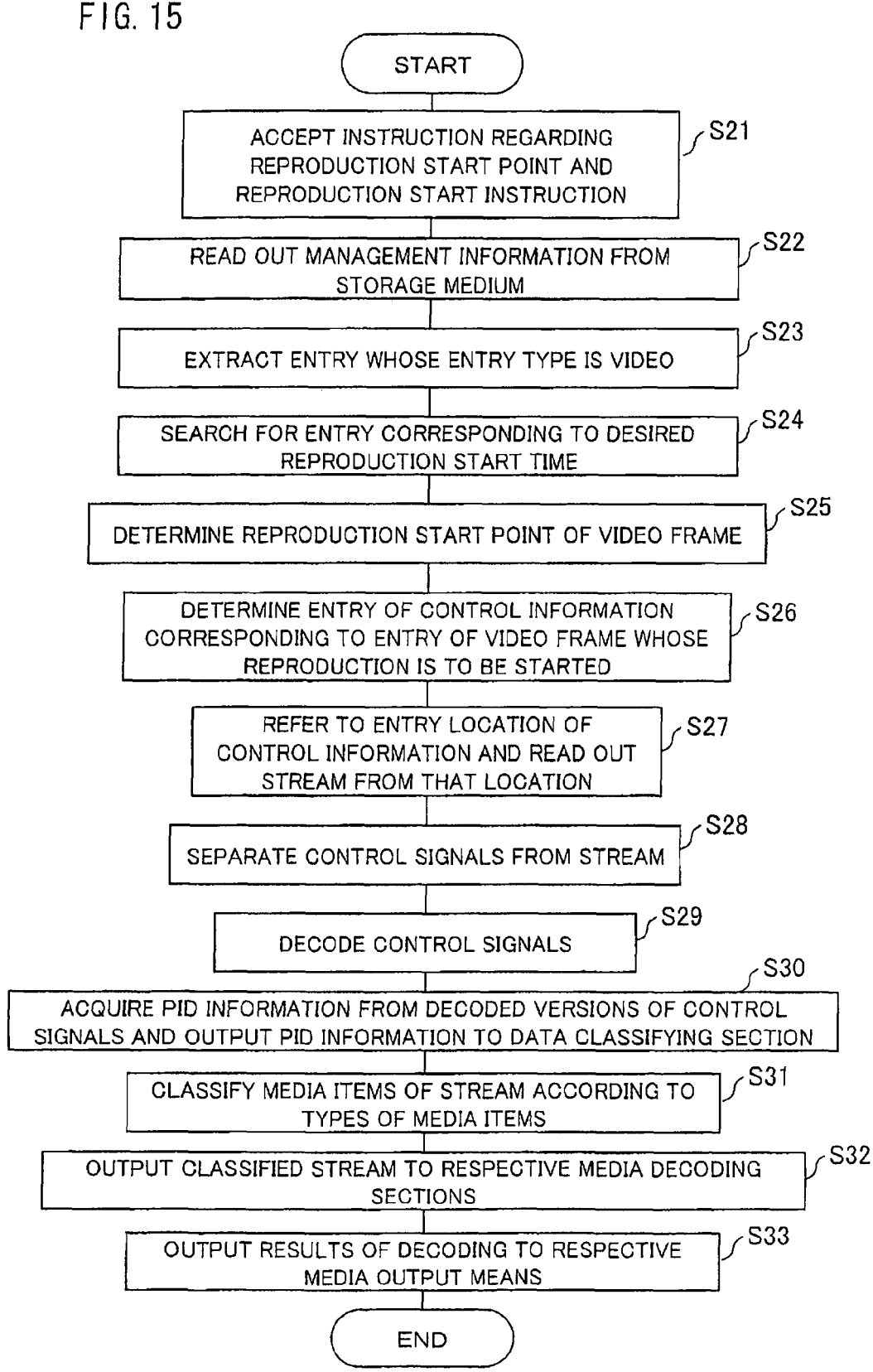
FIG. 15 is a flowchart showing a flow of the processes in the playback apparatus according to an embodiment of the present invention.

Next, operations performed by the sections in the data playback apparatus 800 will be described in detail with reference to FIG. 15. FIG. 15 is a flowchart showing a flow of the processes of starting playback in the data playback apparatus 800. The following description assumes that the entries arranged as illustrated in FIG. 4 are stored in the format illustrated in FIG. 6(a) in the storage medium 104. However, this is not only possibility. For example, the entries arranged as illustrated in FIG. 5 may be used, instead. Alternatively, any of the entries arranged as illustrated in FIGS. 6(b), 6(c), and 7 may be used, instead. Further, the following description assumes that video is played back. However, this is not the only possibility.

To begin with, when the instruction inputting section 808 receives user's instruction regarding playback start point and playback start instruction (S21), the management information analyzing section 802 reads out management information recorded onto the storage medium 104 (S22).

Then, the management information analyzing section 802 extracts entries in which entry type is video from the read management information (S23), searches for an entry corresponding to a desired playback start time from the extracted entries (S24), and determine a video frame playback start point (S25).

At this moment, in some cases, there is difference in unit and description between (i) information concerning the desired playback start time and (ii) information concerning a time stored in the entry. For example, there can be a case where the desired playback time is expressed as a relative time from the head of a file in ms (millisecond), whereas the time stored in the entry is stored as an absolute time in 90 kHz which time is termed the foregoing PTS. In this case, it is necessary to perform conversion of time information before searching for the entry. It should be noted that a time unit is not limited to ms and 90 kHz. Further, the information concerning the desired playback start time and the information concerning the time stored in the entry may be identical time information.

Generally, video frame entries exist at intervals of several seconds. On this account, in many cases there is no video frame entry whose playback time is the same as the desired playback start time. In this case, for example, an entry whose playback time is near the desired playback start time may be selected from among video frame entries whose playback time is before and after the desired playback start time. Alternatively, an entry whose playback time is immediately before the desired playback start time (nearest entry among entries whose playback time is before the desired playback start time) may be selected. The former has the merit that playback is started at a point near the desired playback time. The latter has the merit that video image at the desired playback start time is surely played back.

Further, consider a case where the management information contains (a) an entry including information concerning the location of a random access point (first entry) and (b) an entry including information that is in one-to-one correspondence with a playback time of a random access point (second entry; entry including a pointer to the first entry). In this case, a random access point corresponding to the desired playback start time is analyzed by using the second entry, and the location of a random access point at which playback is to be started is specified on the basis of a result of the analysis and information concerning the location of the random access point included in the first entry. This eliminates the need for directly searching for a first entry corresponding to a target playback time, and makes it possible to easily find the location of the random access point based on the second entry, thus allowing for making an early playback start.

Still further, in a case where the management information includes information indicative of the number of bytes (size) from the head of the stream to each of random access points, analysis on the location of the random access point is carried out on the basis of that information.

Yet further, in a case where the management information includes an index value of each random access point, analysis on the location of the random access point is carried out on the basis of that index value and packet size. For example, the location of a random access point at which playback is desired to be started is determined from a result of multiplication of (i) an index value of the random access point corresponding to a desired playback start time and (ii) a size of each packet.

Further, in a case where the management information includes difference (relative location information) between a size from the head of the stream to each of random access points and a size from the head of the stream to another random access point adjacent to the each of the random access points, analysis on the location of the random access point is carried out on the basis of the relative location information. For example, the location of a random access point at which playback is desired to be started is determined from a result of addition of respective sets of relative location information of random access points that exist from the head of the stream to a random access point corresponding to a desired playback start time.

Still further, in a case where the management information includes difference (relative index value) between an index value (packet number) of each random access point and an index value of another random access point adjacent to the each random access point, analysis on the location of the random access point is carried out on the basis of that relative index value. For example, the location of a random access point at which playback is desired to be started is determined from a result of multiplication of (a) a size of each packet and (b) a result of addition of relative index values of random access points that exist from the head of the stream to a random access point corresponding to a desired playback start time.

In S25, when an entry of a video frame at which playback is to be started is determined (playback start point of video frame is determined), the management information analyzing section 802 determines an entry of control information corresponding to the determined video frame entry (S26), and notifies the stream reading section 803 of the determined control information entry. At this time, the determined control information entry should be a control information entry that exists temporally before and nearest the video frame entry.

The stream reading section 803 refers to the entry location of control information determined by the management information analyzing section 802 to read stream from that location (S27), to output the read stream to the data classifying section 804.

The data classifying section 804 separates control signals from the stream received from the stream reading section 803 and then outputs the control signals to the control information decoding section 805 (S28).

The control information decoding section 805 decodes the control signals received from the data classifying section 804 (S29). Hence, PIDs of packets containing media items such as video, audio, and data are obtained (see FIG. 3).

Next, the control information decoding section 805 outputs the PID information included in the decoded control signals to the data classifying section 804 (S30). This makes it possible for the data classifying section 804 to appropriately classify media items.

That is, the data classifying section 804 classifies media items of the stream received from the stream reading section 803, according to types of the media items, on the basis of the PID information received from the control information decoding section 805 (S31). Then, the data classifying section 804 outputs packets of the classified individual media items to the respectively corresponding decoding sections (832). That is, the data classifying section 804 outputs video compressed data to the video decoding section 806, and outputs audio compressed data to the audio decoding section 807.

The decoding sections decode the respective media items, and then outputs resultants to the respective media output means (S33). That is, the video decoding section 806 decodes video compressed data classified by the data classifying section 804 and then displays the resultant data on video output means (not shown) such as a display. The audio decoding section 807 decodes audio compressed data classified by the data classifying section 804, and outputs the resultant data to audio output means (not shown) such as a speaker.

Thus, it is possible to start playback from a playback start point that the user desires. Thereafter, the following processes are continuously performed, i.e. the process in which the management information analyzing section 802 refers to the entry location of video frame, the process in which the stream reading section 803 reads out a stream from that location, the process in which the data classifying section 804 classifies data according to types of media items and then outputs the classified data to the respective media decoding sections. In this manner, video, audio, and the like are played back. Instead of referring to the entry location of video frame, the management information analyzing section 802 may read control information and continue the reading. In this case, the video decoding section 806 is preferably controlled not to start decoding until a next key frame comes.

It should be noted that in a case where a value indicative of broadcast suspension state is set in the control information entry, data at that part cannot be played back. In such a case, the management information analyzing section 802 searches for an entry of control information in which a value indicative of canceling broadcast suspension is set, and playback is performed from that entry location. Avoidance of the broadcast suspension state part may be performed similarly not only at the start of playback, but also at the time when the broadcast suspension state is recognized during the playback. That is, if the broadcast suspension state is recognized during the playback, the management information analyzing section 802 searches for an entry of control information in which a value indicative of canceling broadcast suspension is set, and playback is restarted from a point corresponding to that entry.

Figure 9:
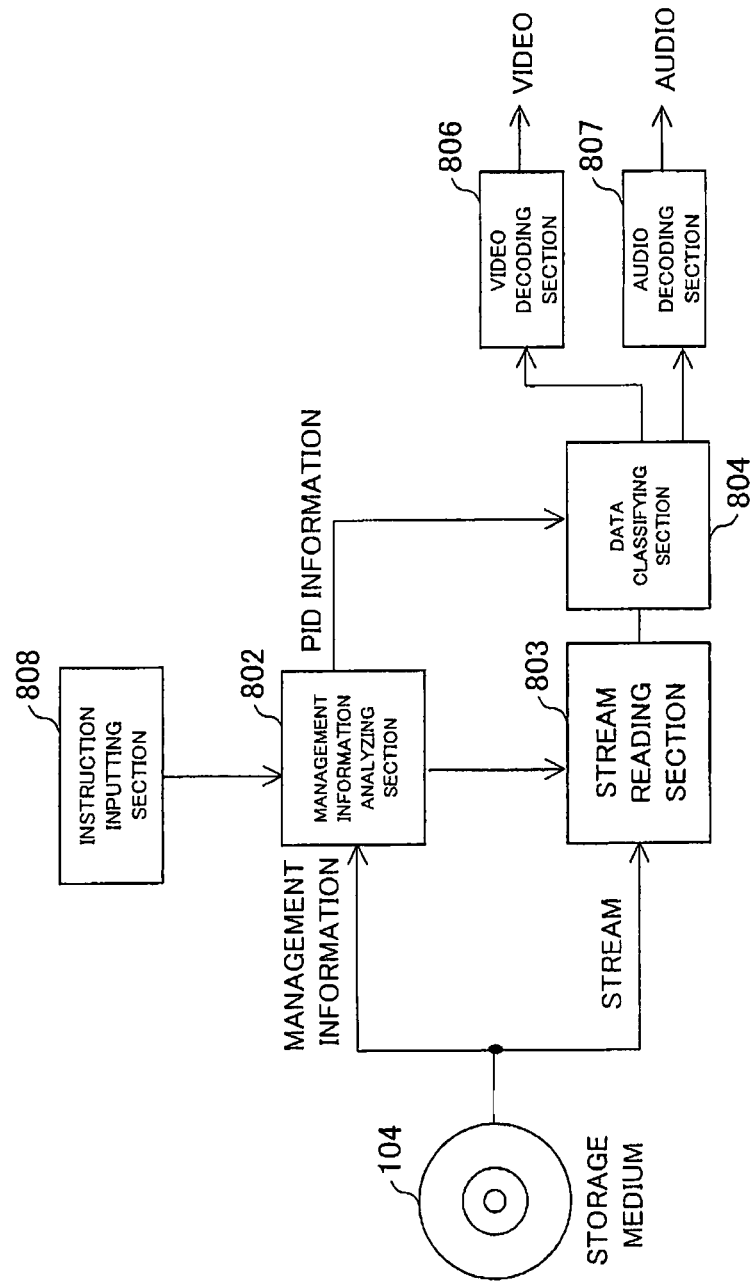
FIG. 9 is a block diagram schematically illustrating another example of the configuration of the playback apparatus according to an embodiment of the present invention.

As described previously, there can be a case where in the data recording apparatus 100, the PID which is described in control information is directly described in an entry, instead of storing the location of control information in the entry. In this case, for example, the management information analyzing section 802 may acquire all PIDs and notifies PID information to the data classifying section 804. In this case, the PID information is notified of the data classifying section 804 by the management information analyzing section 802. This eliminates the need for the process in which the data classifying section 804 searches for control information and the process in which the control information decoding section 805 decodes the control information. Therefore, as illustrated in FIG. 9, the control information decoding section 805 can be omitted.

However, this is not only the possibility. For example, in the data playback apparatus 800 arranged as illustrated in FIG. 8, identical PID information may be notified from both the management information analyzing section 802 and the control information decoding section 805 to the data classifying section 804.

In the data recording apparatus 100, there can be a case where PIDs directly described in the entries are only PIDs of video, audio, and the like. In this case, the PIDs obtained by the management information analyzing section 802 are notified from the management information analyzing section 802 to the data classifying section 804, whereas the other PIDs are acquired by the control information decoding section 805 and notified to the data classifying section 804. Alternatively, regarding PIDs of video, audio, and the like directly described in entries, identical PID information may be notified from both the management information analyzing section 802 and the control information decoding section 805 to the data classifying section.

(Fast-Forward/Fast-Rewind Playback Operation of Data Playback Apparatus 800)

Next, the following will describe operations of the data playback apparatus 800 that reproduces a file in fast-forward at Nth speed (N is any number) in a forward direction, and reproduces a file in fast rewind at Nth speed in a reverse direction.

Figure 10:
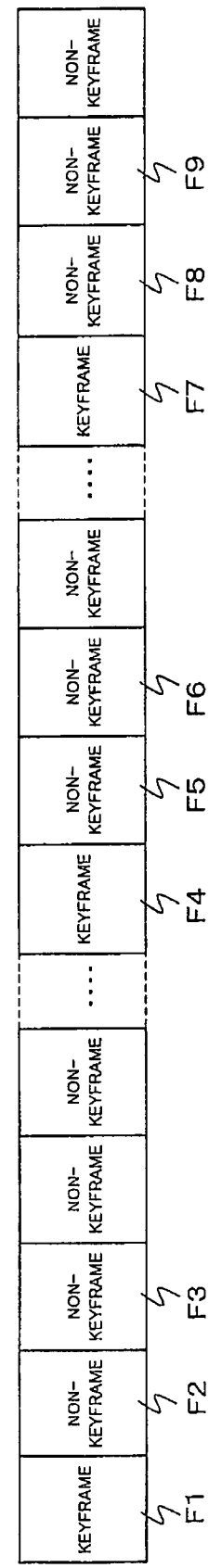
FIG. 10 is an explanatory view of the order of video frames transferred in performing fast-forward and fast-rewind playback in the playback apparatus according to an embodiment of the present invention.
Figure 11:
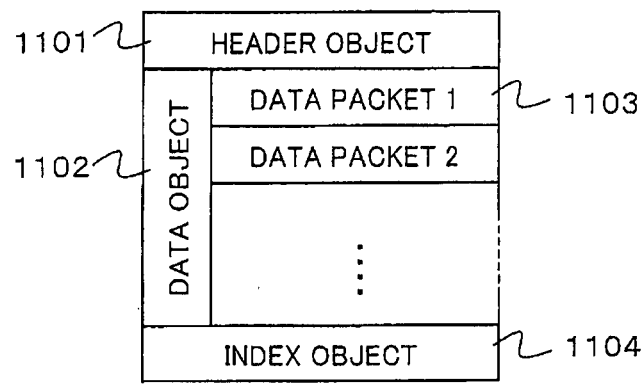
FIG. 11 is an explanatory view of the general structure of a typical ASF file.
Figure 12:
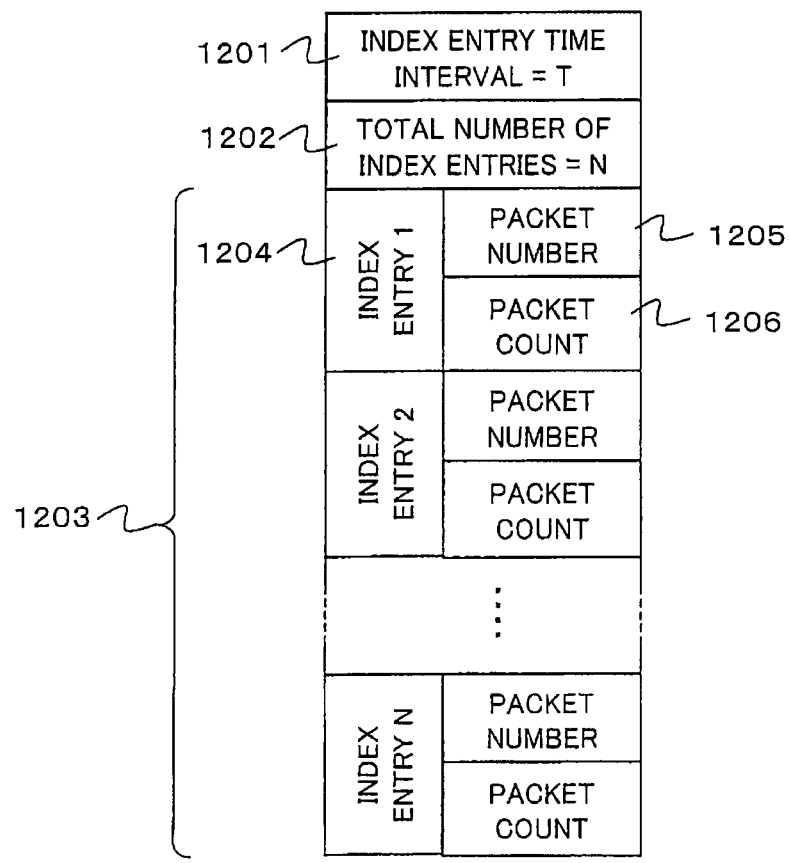
FIG. 12 is an explanatory view of the general structure of the index object included in the ASF file illustrated in FIG. 11.
Figure 13:
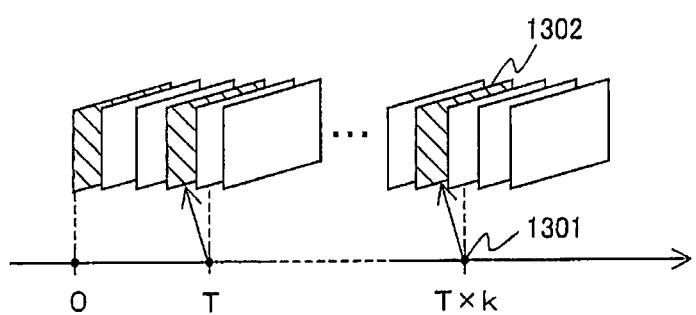
FIG. 13 is an explanatory view showing correspondence between index entries and frames in moving image content, in the ASF file illustrated in FIG. 11.

Generally, Nth-speed playback is realized by thinning out video frames and transferring the video frames to the video decoding section 806. For example, assume that a video data string as illustrated in FIG. 10 is used. In this case, transfer to the video decoding section 806 for fast-forward playback is performed in the order of F1, F2, F3, F4, F5, F6, F7, F8, and F9. Transfer to the video decoding section 806 for fast-rewind playback is performed in the order of F7, F8, F9, F4, F5, F6, F1, F2, and F3. In the example in FIG. 10, a keyframe followed by two non-keyframes are transferred. However, this is not the only possibility. The number of non-keyframes to be transferred to the video decoding section 806 may be calculated each time according to a speed (value of N), time interval between keyframes, or others. Alternatively, the number of non-keyframes to be transferred uniformly may be determined from a speed. Further, all keyframes are not necessarily transferred. For example, transfer may be controlled so that after F1 and F2, F7 and F8 may be transferred, instead of keyframe F4.

Further, it is possible to realize fast-forward/fast-rewind playback at a desired speed not only by thinning out video frames, but also by ignoring time information in the video decoding section 806 to perform display at a predetermined frame rate or by rewriting video display time information to an appropriate time for transfer to the video decoding section 806.

In such fast-forward/fast-rewind playback operations, the operation in which control information corresponding to that key frame is analyzed for acquisition of video PID is repeated, before keyframe transfer to the video decoding section 806.

In order to simplify such an operation, at the recording onto the storage medium 104, an entry may be updated only when description of the control information is changed, not every time the control information is received. In this case, at the fast-forward/fast-rewind playback operations in a playback apparatus, it becomes obvious whether or not control information corresponding to a keyframe to be transferred to the video decoding section 806 is identical with already interpreted control information. This makes it possible to eliminate the process of analyzing the already interpreted control information.

As described above, in the data playback apparatus 800 of the present embodiment, the management information analyzing section 802 analyzes the location of a random access point on the basis of the management information which is recorded with the stream onto the storage medium 104, and the stream reading section 804 reads out the stream recorded onto the storage medium 104 on the basis of the location of the random access point analyzed by the management information analyzing section 802. Then, the data classifying section 804 classifies packets into packets including control information and packets including media items, and the video decoding section (first media decoding section) 806 and the audio decoding section (second media decoding section) 807 decodes the packets including media items (video and audio).

In such a manner, the location of the random access point are analyzed on the basis of the management information recorded with the stream onto the storage medium, and the stream is read out on the basis of a result of the analysis. This makes it possible to quickly obtain the control information. Thus, early start of playback is possible even if control signals are inserted into the stream at regular intervals.

In a case where the management information is recorded in such a manner so as to be multiplexed into the stream, a management information separating section (not shown) may be provided at the previous stage to the management information analyzing section 802. The management information separating section separates the management information multiplexed into the stream. With this arrangement, even when the management information is recorded in such a manner so as to be multiplexed into the stream, the management information and the stream are separated, so that the locations of random access points can be quickly analyzed on the basis of the separated management information.

The foregoing embodiments assume that the data recording apparatus 100 and the data playback apparatus 800 are independent apparatuses. However, this is not the only possibility. Alternatively, an apparatus (recording/playback apparatus) which includes both the data recording apparatus 100 and the data playback apparatus 800 may be provided. In this case, at the recording the stream and the management information are recorded onto the storage medium 104, and at the playback the location of a random access point is analyzed on the basis of the management information recorded with the stream onto the storage medium 104, and it is possible to quickly obtain the control information on the basis of a result of the analysis. Thus, it is possible to early start playback of the stream recorded on the storage medium.

In the foregoing embodiments, the foregoing members are functional blocks which are realized by a CPU or other computing means executing program code contained in a ROM, RAM, or other storage medium. With this arrangement, an object of the present invention is realized by a predetermined storage medium. The storage medium stores, in computer-readable manner, program codes (executable code program, intermediate code program, and source program) of the program which is software for realizing the functions of the aforesaid members. The storage medium is provided to a system or an apparatus. With this arrangement, a computer provided in the system or the apparatus (alternatively, CPU) reads out and executes program code stored in the storage medium.

On the other hand, these members may be realized as hardware carrying out processes similar to those performed by the software. In this case, an object of the present invention is realized by members that are hardware provided in the data recording apparatus 100 (random access information analyzing section 101, control information decoding section 102, management information generating section 103, recording control section 105, and reception control section 106), members that are hardware provided in the data playback apparatus 800 (management information analyzing section 802, stream reading section 803, data classifying section 804, video decoding section 806, and audio decoding section 807), and others. These members can be realized by a combination of hardware carrying out some of the processes and computing means controlling the hardware and executing program code for the other processes. Further, those members which were described as hardware may be realized by a combination of hardware carrying out some of the processes and computing means controlling the hardware and executing program code for the other processes.

The computing means may be a single entity, or a set of computing means connected over internal device bus and various communications paths may work together to execute program code.

Therefore, the random access information analyzing section 101, the control information decoding section 102, the management information generating section 103, the recording control section 105, and the reception control section 106 can be provided at any place inside the data recording apparatus 100. Further, the management information analyzing section 802, the stream reading section 803, the data classifying section 804, the video decoding section 806, and the audio decoding section 807 can be provided at any place inside the data playback apparatus 800.

The program code itself directly executable by the computing means or the program as data that can generate program code by decompression or an other process (detailed later) is executed by the computing means after the program (program code or the data) is recorded and distributed on a storage medium or the program is transmitted and distributed over communications means which transmits the program over wired or wireless communications paths.

To transmit over a communications path, a program is transmitted though the communications path by means of a series of signals indicative of a program which propagates through the transmission media constituting the communications path. To transmit a series of signals, a transmitter device may modulate a carrier wave with the series of signals indicative of the program to transmit the series of signals on the carrier wave. In this case, a receiver device will restore the series of signals by demodulating the carrier wave. Meanwhile, when transmitting the series of signals, the transmitter device may divides the series of signals as a series of digital data into packets for a transmission. In this case, the receiver device will combine received group of packets to restore the series of signals. In addition, the transmitter device may transmit the series of signals by time division, frequency division, code division, or another multiplex scheme involving the series of signals and another series of signals. When this is the case, the receiver device will extract individual series of signals from a multiplex series of signals to restore them. In any case, similar effects are obtained if the program can be transmitted over a communications path.

Here, the storage medium for the distribution of a program is preferable removable. After the distribution of the program, the storage medium may or may not be removable. In addition, the storage medium may or may not be rewriteable (writeable) or volatile, be recordable by any method, and come in any shape at all, provided that the medium can hold the program. Examples of such a storage medium include tapes, such as magnetism tapes and cassette tapes; magnetic disks, such as floppy (registered trademark) disks and hard disks; and other discs, such as CD-ROMs, magneto-optical discs (MOs), mini discs (MDs), and digital video discs (DVDs). In addition, the storage medium may be a card, such as an IC card or an optical card; a semiconductor memory, such as a mask ROM, an EPROM, an EEPROM, or a flash ROM; or a memory provided inside a CPU or other computing means.

The program code may be such that it instructs the computing means regarding all the procedures of the members. If there is already a basic computer program (for example, an operating system or library) which can be retrieved by a predetermined procedure to execute all or some of the processes, code or a pointer which instructs the computing means to retrieve that basic computer program can replace all or some of the processes.

In addition, the program storage format of the storage medium may be, for example, such that: the computing means can access the program for an execution as in an actual memory having loaded the program; the program is not loaded into an actual memory, but installed in a local storage medium (for example, an actual memory or hard disk) always accessible to the computing means; or the program is stored before installing in a local storage medium from a network or a mobile storage medium.

In addition, the program is not limited to compiled object code. The program may be stored in the storage medium as source code or intermediate code generated in the course of interpretation or compilation. In any case, similar effects are obtained regardless of the format in which the storage medium stores the program, provided that decompression of compressed information, decoding of encoded information, interpretation, compilation, links, or loading to an actual memory or combinations of these processes can convert the intermediate code into a format executable by the computing means.

Further, a recording apparatus of the present invention can be expressed as a recording apparatus which receives a stream including compressed video data and records the stream, the recording apparatus including: a control information decoding section which receives the stream made up of a plurality of packets and decodes sets of control information contained in the stream; a random access information analyzing section which carries out analysis of locations of random access points of media items contained in the stream by using the sets of control information and information contained in the stream; a management information generating section which generates management information from the sets of control information and the locations of the random access points; and a storage medium which is capable of retaining the stream and the management information, wherein the management information includes plural types of sets of information on random access points of the stream.

According to the above arrangement, the management information stores therein (a) the sets of control information contained in the stream and (b) respective locations and types of the random access points of media items, so that the information (a) and the information (b) can be collectively managed and used. That is, the above arrangement brings about the effect that plural types of sets of information on random access points contained in the stream can be recorded in a management file.

Still further, a recording apparatus of the present invention can be expressed as a recording apparatus which receives a stream including compressed video data and records the stream, the recording apparatus including: a control information decoding section which receives the stream made up of a plurality of packets and decodes sets of control information contained in the stream; a random access information analyzing section which carries out analysis of locations of random access points of media items contained in the stream by using the sets of control information and information contained in the stream; a management information generating section which generates management information from the sets of control information and the locations of the random access points; a management information multiplexing section which multiplexes the management information with the packets; and a storage medium which is capable of retaining the stream having the multiplexed management information and packets, wherein the management information includes plural types of sets of information on random access points of the stream.

According to the above arrangement, the stream is recorded with the sets of control information added thereto. This eliminates the need for differentiating the random access point of the control information and the random access point of the media item.

Yet further, in the above arrangement, the recording apparatus of the present invention can be arranged such that the management information is made up of a plurality of entries, each of which contains information concerning a type, a location, a playback time, and others of the random access point.

According to the above arrangement, the management information only needs to include entries the number of which is the same as the number of random access points of the media items contained in the stream. This makes it possible to reduce a size of the management information.

Further, in the above arrangement, the recording apparatus of the present invention can be arranged such that the management information has first entries and second entries, the first entries including sets of information concerning types, locations, and others of the random access points, the second entries including pointers to the first entries.

According to the above arrangement, with reference to a second entry that is in one-to-one correspondence with a playback time, it is possible to quickly find a corresponding first entry without searching for the first entry.

Still further, in the above arrangement, the recording apparatus of the present invention can be arranged such that the management information includes PIDs required for playback of media items contained in the stream.

According to the above arrangement, it is possible to omit a step of decoding the sets of control information.

Yet further, in the above arrangement, the recording apparatus of the present invention can be arranged such that the information concerning the location of the random access point is a size from the head of the stream to the random access point.

Yet further, in the above arrangement, the recording apparatus of the present invention can be arranged such that the information concerning the location of the random access point is a packet number from the head of the stream.

According to the above arrangement, it is possible to easily find the location of a packet corresponding to a random access point.

Further, in the above arrangement, the recording apparatus of the present invention can be arranged such that the information concerning the location of the random access point is a difference in size between adjacent entries included in the management information.

Still further, in the above arrangement, the recording apparatus of the present invention can be arranged such that the information concerning the location of the random access point is a difference in packet number between adjacent entries included in the management information.

According to the above arrangement, the location of a packet corresponding to a random access point is a difference between two consecutive entries included in the management information. This makes it possible to reduce a size of the entire management information.

Further, a playback apparatus of the present invention can be expressed as a playback apparatus which reads a stream and its management information recorded on a storage medium and plays back media items such as video and audio, the playback apparatus including: a management information analyzing section which analyzes information on a random access point of the management information; a stream reading section which reads out a target stream out of streams stored in the storage medium on the basis of the information on random access point; a data classifying section which classifies the read stream into sets of control information, sets of video information, and sets of audio information; a control information decoding section which extracts control information required for the data classification from the sets of control information; and a video decoding section and an audio decoding section which decode the classified video information and the classified audio information, respectively, wherein the management information includes plural types of sets of information on random access points of the stream.

According to the above arrangement, it is possible to quickly obtain a keyframe and a head location of the corresponding control information by analyzing a management file, and to quickly obtain the control information from the stream. This makes it possible to early start playback of recorded content. Further, the above arrangement brings about the effect that, for example, control information, such as a PID required for playback start, and the location of keyframe information can be quickly obtained and an early playback start becomes possible.

Still further, a playback apparatus of the present invention can be expressed as a playback apparatus which reads out a stream and its management information recorded on a storage medium and plays back media items such as video and audio, the playback apparatus including: a management information separating section which separates management information from the stream; a management information analyzing section which analyzes information on a random access point of the management information; a stream reading section which reads out a target stream out of streams stored in the storage medium on the basis of the information on random access point; a data classifying section which classifies the read stream into sets of control information, sets of video information, and sets of audio information; a control information decoding section which extracts control information required for the data classification from the sets of control information; and a video decoding section and an audio decoding section which decode the classified video information and the classified audio information, respectively, wherein the management information includes plural types of sets of information on random access points of the stream.

According to the above arrangement, it is possible to quickly obtain control information required for detection of a keyframe at the time of reading from the stream. This speeds up a keyframe analyzing process, and it is possible to make an early start of recorded content playback.

Yet further, in the above arrangement, the playback apparatus of the present invention can be arranged such that the management information analyzing section analyzes management information which is made up of a plurality of entries, each of which contains information concerning a type, a location, a playback time, and others of the random access point.

According to the above arrangement, control information required for detection of a keyframe and the keyframe can be quickly found on the basis of the type of a random access point. This makes it possible to make an early playback start.

Further, in the above arrangement, the playback apparatus of the present invention can be arranged such that the management information analyzing section analyzes the management information having first entries and second entries, the first entries including sets of information concerning types, locations, and others of the random access points, the second entries including pointers to the first entries, analyzes the second entry from time information, and then analyzes the first entry to obtain the information on a random access point.

According to the above arrangement, it is possible to easily find an entry corresponding to a target playback time without the need for searching for that entry.

Still further, in the above arrangement, the playback apparatus of the present invention can be arranged such that the management information analyzing section analyzes the control information directly described in the management information, and the data classifying section carries out data classifying process by using the control information obtained by the management information analyzing section.

According to the above arrangement, data classifying process can be started without decoding of the control information in the control information decoding section. This makes it possible to make an early playback start.

Yet further, in the above arrangement, the playback apparatus of the present invention can be arranged such that the stream reading section reads out a random access point described in the management information corresponding to a target stream by using information on size from the head of the stream.

Further, in the above arrangement, the playback apparatus of the present invention can be arranged such that the stream reading section obtains the location of a packet containing a random access point described in the management information corresponding to a target stream, by using a product of a packet number of the packet from the head of the stream and a packet size.

According to the above arrangement, it is possible to quickly obtain the location of a keyframe or control information in the recorded stream from the head of the stream.

Still further, in the above arrangement, the playback apparatus of the present invention can be arranged such that the stream reading section obtains a random access point described in the management information corresponding to a target stream, by addition of respective sets of relative location information described in the entries, which are included in the management information, from the head of the stream.

Yet further, in the above arrangement, the playback apparatus of the present invention can be arranged such that the stream reading section obtains the location of a packet including a random access point described in the management information corresponding to a target stream, by multiplication of (a) a result of addition of respective relative index values described in the entries, which are included in the management information, and (b) a size of the packet.

According to the above arrangement, it is possible to quickly find information on a keyframe stored near the location of the control information.

Further, a recording/playback apparatus of the present invention can be expressed as a recording/playback apparatus which receives a stream including compressed video data and records the stream, the recording/playback apparatus including: a control information decoding section which receives the stream made up of a plurality of packets and decodes sets of control information contained in the stream; a random access information analyzing section which carries out analysis of locations of random access points of media items contained in the stream by using the sets of control information and information contained in the stream; a management information generating section which generates management information from the sets of control information and the locations of the random access points; and a storage medium which is capable of retaining the stream and the management information, a management information analyzing section which analyzes information on a random access point of the recorded management information; a stream reading section which reads out a target stream out of streams stored on the basis of the information on random access point; a data classifying section which classifies the read stream into sets of control information, sets of video information, and sets of audio information; a control information decoding section which extracts control information required for the data classification from the sets of control information; and a video decoding section and an audio decoding section which decode the classified video information and the classified audio information, respectively, wherein the management information includes plural types of sets of information on random access points of the stream.

According to the above arrangement, the management information stores therein (a) the sets of control information contained in the stream and (b) respective locations and types of the random access points of media items, so that the information (a) and the information (b) can be collectively managed and used. At the playback, it is possible to quickly obtain a keyframe and a head location of the corresponding control information by analyzing a management file, and to quickly obtain the control information from the stream. This makes it possible to early start playback of recorded content.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a recording apparatus which records a stream made up of a plurality of packets, a playback apparatus which plays back the stream, and a recording/playback apparatus including the recording apparatus and the playback apparatus. A storage medium used in these apparatuses, i.e. the recording apparatus, the playback apparatus, and the recording/playback apparatus is not particularly limited. For example, the storage medium may be a tape, such as a magnetic tape and a cassette tape; a magnetic disk, such as a flexible disk and a hard disk; a disc such as a CD/MO/MD/DVD; a card, such as an IC card (including memory card); and a semiconductor memory, such as a mask ROM, an EPROM (Erasable Programmable Read Only Memory), an EEPROM (Electrically Erasable Programmable Read Only Memory), or a flash ROM. The stream may be recorded on a transmission medium (which holds data in a flowing manner), such as a communication network (connected via wired lines or by wireless) including the Internet. Further, the stream supplied from the transmission medium may be played back.

The invention claimed is:

1. A recording apparatus which records a stream onto a storage medium, the stream being made up of a plurality of packets and having sets of control information inserted therein, the recording apparatus comprising:
   a control information decoding section which decodes the control information;
   a random access information analyzing section which carries out analysis of locations of random access points of media items contained in the stream, on the basis of at least one of (a) the control information, (b) head identification information contained in the packets, and (c) type information contained in a head of each frame of the stream;
   a management information generating section which generates management information for managing a plurality of random access points contained in the stream, on the basis of the decoded control information and the locations of the random access points obtained by the analysis; and
   a recording control section which records the stream and the generated management information onto the storage medium, wherein
   the management information generating section generates the management information that holds sets of information respectively indicative of the locations of the random access points having identical random access types, wherein an order of arrangement of the sets of information corresponds to a temporal order of the corresponding random access points in the stream.

2. The recording apparatus according to claim 1, further comprising:
   a management information multiplexing section which multiplexes the management information with the packets contained in the stream, wherein
   said recording apparatus records onto the storage medium multiplexed information in which the management information is multiplexed with the packets.

3. The recording apparatus according to claim 1, wherein the management information includes a plurality of entries, each of which includes information concerning the location of the random access point, and information concerning a playback time for the random access point.

4. The recording apparatus according to claim 1, wherein the management information includes first entries and second entries, each of the first entries containing information concerning the location of the random access point, each of the second entries containing information that is in one-to-one correspondence with a playback time of the random access point.

5. The recording apparatus according to claim 1, wherein the management information includes PIDs indicating types of media items contained in the stream.

6. The recording apparatus according to claim 1, wherein the management information includes information concerning the location of the random access point, which is a size from a head of the stream to each of the random access points.

7. The recording apparatus according to claim 1, wherein the management information includes information concerning the location of the random access point, which is a packet number sequentially assigned to each packet contained in the stream, starting from a packet located at a head of the stream.

8. The recording apparatus according to claim 1, wherein the management information includes information concerning the location of the random access point, which is a difference between a size from the head of the stream to each random access point and a size from the head of the stream to another random access point adjacent to it.

9. The recording apparatus according to claim 1, wherein the management information includes information concerning the location of the random access point, which is a difference between a packet number, sequentially assigned to the packets contained in the stream, starting from a packet located at a head of the stream, of each random access point and a packet number of another random access point adjacent to it.

10. A playback apparatus which reads a stream from a transmission medium, the stream being made up of a plurality of packets and having sets of control information inserted therein, wherein
   the packets have their respective PIDs (Packet IDs),
   each of the sets of control information includes PIDs of media items contained in the stream, and
   the playback apparatus reads, from the transmission medium, the stream and management information for managing a plurality of random access points contained in the stream, and the management information includes the PIDs of the media items and has respective sets of information indicative of the locations of the random access points of the media items corresponding to the PIDs, wherein the sets of information are arranged in a temporal order of the corresponding random access points in the stream.

11. The playback apparatus according to claim 10, wherein the management information is multiplexed into the stream, the playback apparatus further comprising:
   a management information separating section which separates from the stream the management information.

12. The playback apparatus according to claim 10, wherein the management information includes information concerning a playback time at the random access point.

13. The playback apparatus according to claim 10, wherein the management information includes first entries containing information concerning the location of the random access point, and second entries containing information that is in correspondence with a playback time of the random access point.

14. The playback apparatus according to claim 10, wherein the management information includes information indicating a size from the head of the stream to each of the random access points.

15. A recording/playback apparatus comprising:
a recording apparatus according to claim 1; and
a playback apparatus which reads a stream from a storage medium, the stream being made up of a plurality of packets and having sets of control information inserted therein, wherein
the storage medium includes the stream and management information for managing a plurality of random access points contained in the stream, and the management information at least includes information identifying the control information, regarding random access points of the control information,
the playback apparatus comprising:
a management information analyzing section which analyzes a location of a random access point on the basis of the management information;
a stream reading section which reads the stream recorded onto the storage medium, on the basis of the location of the random access point obtained by the analysis;
a data classifying section which classifies the packets contained in the read stream into packets containing the control information and packets containing media items; and
a media decoding section which decodes the packets containing the media items.

16. A recording method of recording a stream onto a storage medium, the stream being made up of a plurality of packets and having sets of control information inserted therein, the recording method comprising:
a control information decoding step of decoding the control information;
a random access information analyzing step of carrying out analysis of locations of random access points of media items contained in the stream, on the basis of at least one of (a) the control information, (b) head identification information contained in the packets, and (c) type information contained in a head of each frame of the stream;
a management information generating step of generating management information for managing a plurality of random access points contained in the stream, on the basis of the decoded control information and the locations of the random access points obtained by the analysis; and
a recording step of recording the stream and the generated management information onto the storage medium, wherein
the management information generating step generates the management information that holds sets of information respectively indicative of the locations of the random access points having identical random access types, wherein an order of arrangement of the sets of information corresponds to a temporal order of the corresponding random access points in the stream.

17. A playback method of reading a stream from a transmission medium, the stream being made up of a plurality of packets and having sets of control information inserted therein, wherein
the packets have their respective PIDs (Packet IDs),
each of the sets of control information includes PIDs of media items contained in the stream, and
from the transmission medium the stream and management information for managing a plurality of random access points contained in the stream are read, and the management information includes the PIDs of the media items and has respective sets of information indicative of the locations of the random access points of the media items corresponding to the PIDs, wherein the sets of information are arranged in a temporal order of the corresponding access points in the stream.

* * * * *